(No Model.) 3 Sheets—Sheet 1.
O. H. MARSTON.
MACHINE FOR MEASURING MEDICINAL POWDERS.
No. 596,756. Patented Jan. 4, 1898.
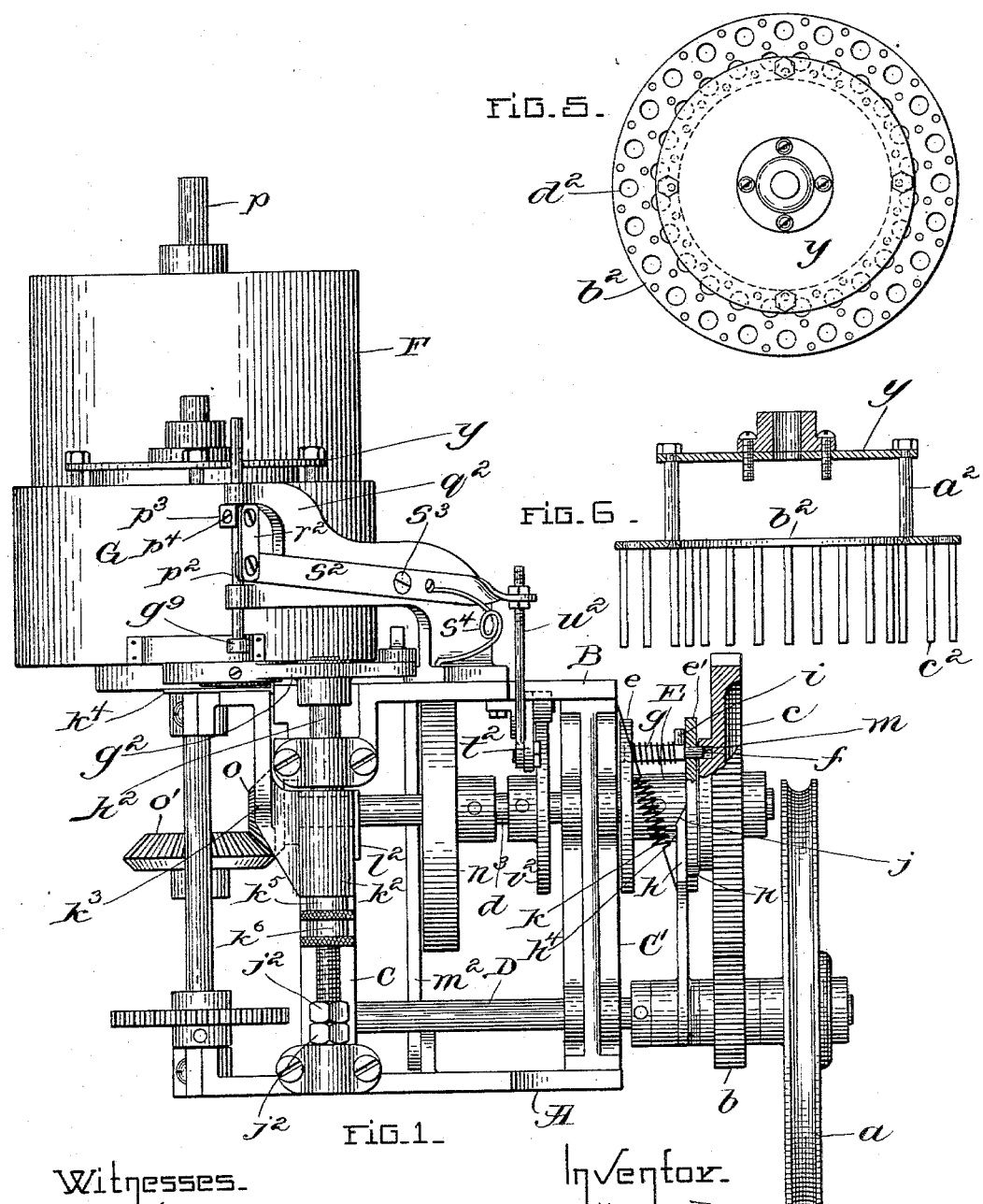

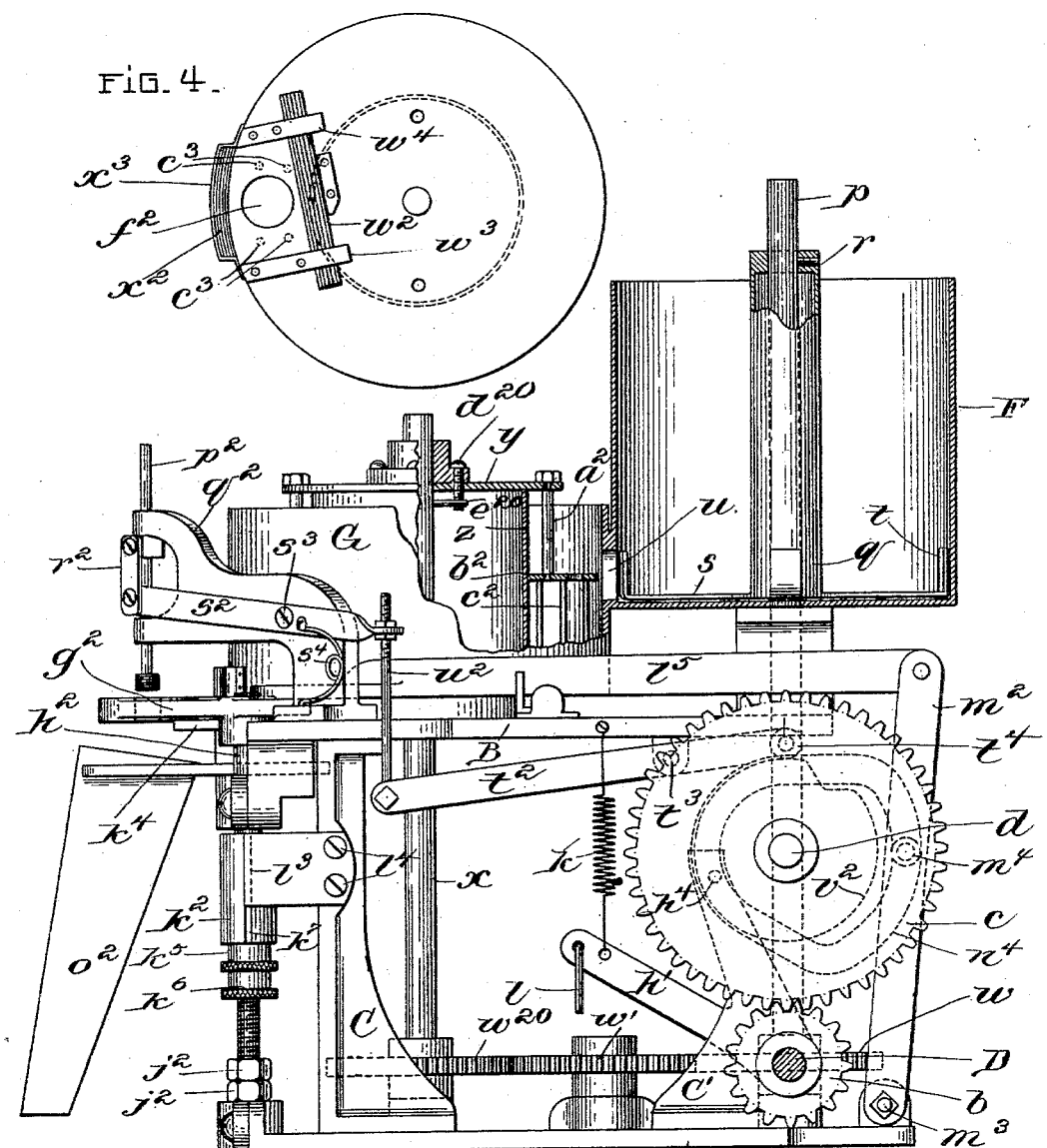

(No Model.) 3 Sheets—Sheet 3.
O. H. MARSTON.
MACHINE FOR MEASURING MEDICINAL POWDERS.
No. 596,756. Patented Jan. 4, 1898.
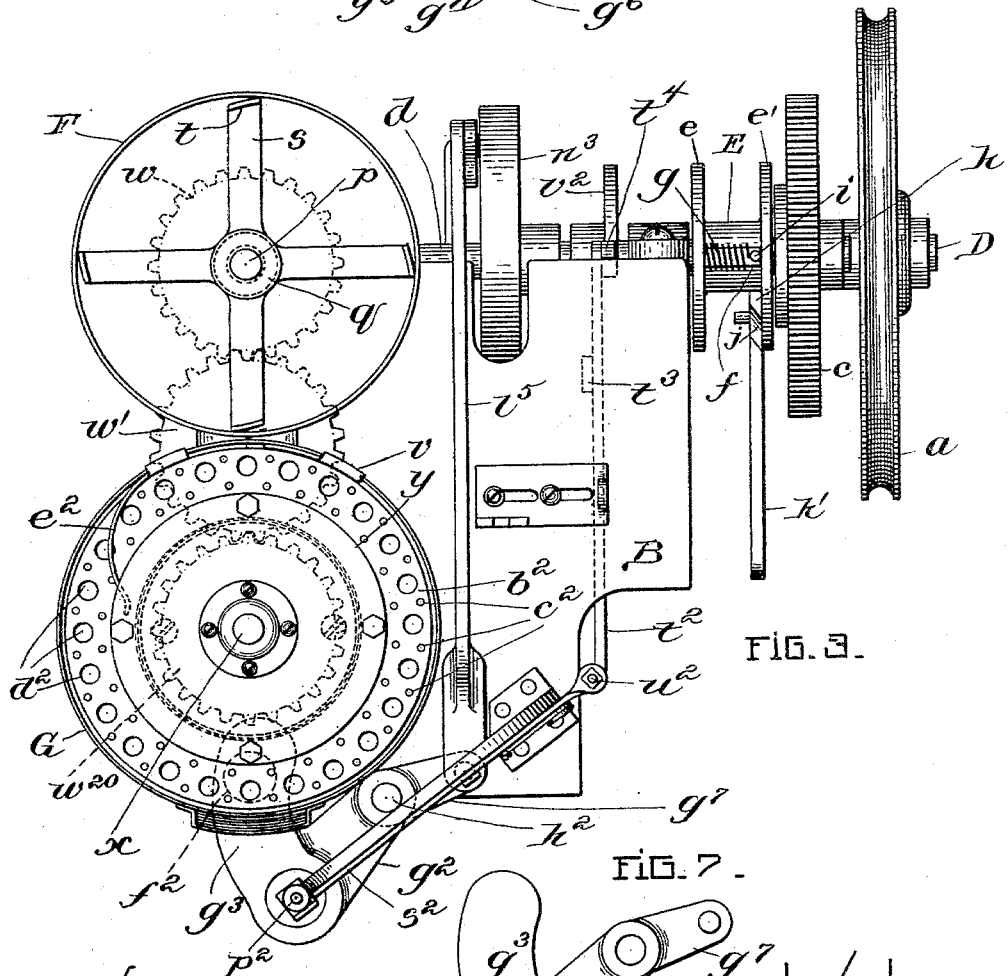

UNITED STATES PATENT OFFICE.

OLIVER H. MARSTON, OF STONEHAM, MASSACHUSETTS.

MACHINE FOR MEASURING MEDICINAL POWDERS.

SPECIFICATION forming part of Letters Patent No. 596,756, dated January 4, 1898.

Application filed July 27, 1896. Serial No. 600,674. (No model.)

*To all whom it may concern:*

Be it known that I, OLIVER H. MARSTON, of Stoneham, in the county of Middlesex and State of Massachusetts, have invented certain new and useful Improvements in Machines for Measuring Medicinal Powders, of which the following is a specification.

My invention has relation to machines for measuring medicinal powders such as are usually put up in small quantities in paper wrappers for the cure of headaches and other physical troubles.

Although primarily designed and particularly adapted to measure powders for medicinal use, it will be evident from what is hereinafter set forth that my invention is not limited in this respect, but may be utilized for measuring granular or pulverulent substances of any kind for various purposes.

My invention has for its object to provide a machine for measuring granular or pulverulent material which shall operate with the greatest uniformity and precision, as well as rapidly and economically; and to these ends it consists in a machine embodying certain new and useful features of construction and arrangement, all as hereinafter more fully set forth and described, and the novel features of which are particularly set forth and clearly defined in the claims at the close of this specification.

Reference is to be had to the accompanying drawings, forming a part of this application, in which like characters indicate like parts wherever they occur.

Of the drawings, Figure 1 is a front elevation of a powder-measuring machine embodying my invention. Fig. 2 is a side elevation thereof viewed from the right in Fig. 1. Fig. 3 is a plan view of the same. Fig. 4 is an inverted plan view of the hopper. Figs. 5 and 6 are a plan and sectional view, respectively, of the revolving portion of the hopper. Fig. 7 is a detail of the reciprocating feed or measuring arm. Figs. 8 and 9 show the measuring-cup.

Proceeding to a description of my invention and its mode of operation, reference is had to the accompanying drawings, in which at A is shown the bed-plate of the frame, upon which is supported the top plate B by means of standards or uprights C and C'. In the uprights C' is journaled the main shaft D, which may be driven in any suitable or convenient manner, but which I have shown as being provided with a belt-wheel $a$, around which an endless belt may be passed. A pinion $b$ is fixed upon the main shaft D and meshes with a gear $c$, which, when not engaged by the clutch mechanism hereinafter described, travels loose upon a counter-shaft $d$, journaled in the uprights C'. The clutch E is fixed to the counter-shaft $d$ and formed or provided with the flanges $e\ e'$, in which a locking-pin $f$ is mounted to slide laterally. The said pin $f$ is thrust in one direction by means of the coiled spring $g$ and is moved in the opposite direction when the stud $i$, projecting from the locking-pin $f$, engages with the beveled face $j$ of the end of the clutch-lever $h$. The clutch-lever $h$ is fulcrumed upon the main shaft D and is formed with an arm $h'$, to which one end of a spring $k$ is secured, the other end of the spring $k$ being secured to the framework of the machine in such manner that the said spring will tend to hold the lever $h$, with the beveled face thereof normally lying in the path of the stud $i$. The stop-pin $n$ engages with the periphery of the flange $e'$ to limit the throw of the lever $h$ toward the clutch mechanism. A connecting-link $l$ is connected to the arm $h'$ and may extend down below the machine to devices by means of which the lever $h$ may be moved by foot-power. The gear $c$ is formed with a socket $m$ in the face thereof adjacent the clutch mechanism, with which the locking-pin $f$ engages to lock the said gear $c$ to the counter-shaft $d$ at a time when the lever $h$ is thrown out of engagement with the said locking-pin. It will thus be seen that if the gear $c$ is in engagement with the clutch mechanism and the lever $h$ be allowed to resume its normal position the beveled or cam face of the end of the lever $h$ will be brought into the path of the stud, and the latter will ride up upon the said cam or beveled face $j$, and the locking-pin will be drawn back and thrown out of engagement with the gear $c$, and the latter will be loose upon the counter-shaft $d$. A stop-pin $h^4$ is provided in the lever $h$, against which the stud strikes to prevent a further rotation of the counter-shaft that might result from momentum. Upon the counter-shaft $d$ is fixed the bevel-gear $o$, which meshes with another bevel-gear $o'$, mounted upon the vertical shaft $p$, which latter is journaled to the frame of the machine and extends up through the center of the receiver or reservoir F, which is supported upon the top plate B. The shaft $p$ has secured thereto and within the receiver F the spider $q$ by means of a set-screw $r$. The arms $s$ of the spider $q$ are provided with upwardly-projecting portions or fingers $t$, whose outer faces are not concentric with the axes upon which the spider revolves, as shown clearly in Fig. 3, and which act with a tendency to force the powder, which is first placed in the receiver, out through the opening or port $u$, which communicates with what I shall for convenience term the "hopper" G. By means of a slide $v$, which is adapted to be slid over the port $u$, the supply of powder to the hopper G may be controlled at will.

A gear $w$, fixed upon the vertical shaft $p$, meshes with a gear $w'$, journaled in the base A of the frame. The gear $w'$ in turn meshes with a gear $w^{20}$, fixed upon a vertical shaft $x$. In this manner power is communicated to the vertical shaft $x$, which extends upwardly through the center of the hopper G and operates the movable portion thereof. The movable or revolving portion of the hopper G consists of a plate or disk $y$, that rests upon the inner walls $z$ of the hopper and is free to revolve thereon. To the disk $y$ and at the outer edge thereof are secured the posts $a^2$, which extend down between the walls of the hopper and support the ring $b^2$. The latter is provided with the downwardly-projecting fingers $c^2$, which, in conjunction with similar upwardly-extending fingers $c^3$, projecting from the bottom of the hopper, act to break up all lumps of the substance to be measured and prevent the latter from "caking" and thus clogging the hopper. The ring $b^2$ is provided or formed with a number of apertures $d^2$ therethrough through which the powder is sifted. This sifting operation is materially assisted by means of the scraper $e^2$, which is secured to the outer walls of the hopper G, the lower edge of which rests down upon the face of the ring $b^2$. A screw $d^{20}$, extending down through the disk $y$, engages a pin $e^{20}$, that projects outwardly from the shaft $x$, so that as the shaft $x$ is rotated the disk is revolved therewith. The bottom of the hopper is formed with an aperture $f^2$ therethrough through which the powder passes by gravity to the measuring device now to be described in connection with mechanism for operating the same.
At $g^2$ is a rocker-arm secured to the upper end of a vertical rocker-shaft $h^2$, that is journaled in the frame of the machine. The rocker-arm $g^2$ is formed with a curved portion $g^3$, that is concentric with the axes of the rocker-shaft $h^2$ and is of such a length that a portion thereof is always under the aperture $f^2$, provided in the bottom of the hopper G.

The rocker-arm $g^2$ is formed with a hole $g^{31}$, in which is secured a measuring-cup $g^4$ by means of a set-screw $g^5$. A hole $g^6$ is formed through the cup $g^4$ large enough to hold or accommodate a given quantity of the powder. By making the cups $g^4$ removable others formed with openings $g^6$ of different sizes for measuring greater or less quantities of powder may be substituted. For adjusting the upper face of the rocker-arm to a nicety with relation to the under side of the hopper G the lower extremity of the rocker-shaft is threaded to receive nuts $j^2 j^2$, by means of which the rocker shaft and arm may be moved vertically.

A sleeve $k^2$ encircles the rocker-shaft and is formed with an upwardly-projecting offset portion $k^3$, to the top face of which is secured the plate $k^4$, which is of such an area or size as to contact with the under side of the cup $g^4$, and while the latter is under the hopper close the opening $g^6$ at the under side and prevent the powder dropping through until the cup has been drawn out beyond the plate $k^4$. For adjusting the plate $k^4$ with relation to the under side of the cup $g^4$ I provide thumb-nuts $k^5 k^6$ upon the threaded portion of the rocker-shaft, upon which the sleeve $k^2$ rests. This sleeve $k^2$ is prevented from rocking with the shaft by means of a clip $l^2$, secured to the frame of the machine by screws $l^4 l^4$ and formed with a tongue $l^3$, that fits into a groove $k^7$ in the sleeve $k^2$.

To an arm $g^7$ of the rocker-arm is pivoted the forward end of a link $l^5$, which, at its rear end, is pivoted to a lever $m^2$, which is fulcrumed at $m^3$ to the lower base-plate A of the frame. The lever $m^2$ carries a roll $m^4$, which travels in a cam-slot $n^4$ of the cam $n^3$, which is mounted, as shown, upon the counter-shaft $d$. By this mechanism a rocking or reciprocating motion is transmitted to the rocker-arm, which is fulcrumed upon the vertical rocker-shaft in such position with relation to the hopper that the concentric portion thereof carrying the cup $g^4$ moves back and forth between the bottom of the hopper and plate $k^4$ and directly under the opening formed in the bottom of the hopper. As the cup $g^4$ registers with the opening in the hopper the powder falls by gravity into the opening $g^6$ thereof, and when the rocker-arm moves forward that powder contained in the opening $g^6$ is carried forward until the cup is in a position beyond the plate $k^4$, when the powder will be delivered to a chute or funnel $o^2$, through which it is guided in its descent and deposited upon a wrapper held or placed in a proper position at the exit or lower end of the funnel. For insuring the speedy and sure discharge of the powder from the opening $g^6$ of the cup $g^4$ I provide a plunger $p^2$, sliding in a bracket $q^2$, secured to the top plate of the frame. It carries a block $p^3$, clamped thereto by a screw $p^4$, which permits of adjustment of the plunger with relation to the opening $g^6$. To the block $p^3$ is pivoted one end of a link $r^2$, which is in turn pivoted at its other end to one end of a lever $s^2$. The lever $s^2$ is fulcrumed at $s^3$, and is connected at its opposite end to the end of a lever $t^2$ by means of a link $u^2$. The lever $t^2$ is fulcrumed at $t^3$ to the top plate of the frame and provided at its opposite end with a cam-roll $t^4$, which bears upon the face of a cam $v^2$, secured upon the counter-shaft $d$. A spring $s^4$ tends to hold the roll $t^4$ in engagement with the cam $v^2$. By means of this mechanism a quick vertical up-and-down movement is imparted to the plunger $p^2$ at a time when the opening $g^6$ is in vertical alinement therewith— that is, when the rocker-arm is in its extreme forward position and the opening $g^6$ is over the funnel or chute $o^2$. The end of the plunger $p^2$, which passes down through the opening $g^6$, is provided with a wad $g^9$, of felt or other suitable material, which fits the opening $g^6$ and forces out all the particles of the powder that might otherwise adhere to the sides of the opening $g^6$.

In order to keep the upper surface of the rocker-arm clean and prevent the powder or other substance caking thereon, I provide wipers $w^2 x^2$, located at either side of the opening $g^6$ in the line of travel of the rocker-arm. The wiper $w^2$ consists of a strip of felt or other suitable material, held in position by means of the leaf-springs $w^3 w^4$, which are secured to the under side of the hopper, as shown clearly in Fig. 4. The wiper $x^2$ consists of a wad of felt or similar substance held within a bracket $x^3$, so as to bear against the upper face of the rocker-arm.

In Figs. 8 and 9 I have shown, respectively, an inverted plan and transverse sectional view of the cup $g^4$. The aperture $g^6$ is formed therethrough, as shown, and around the outside of the downwardly-projecting portion $g^7$, is secured the band or belt $g^8$, of felt or other equivalent material, which projects slightly beyond the lower edge and is intended to contact with the face of the plate $k^4$ and prevent the escape of any of the powder during the forward movement of the rocker-arm. A ring $g^{10}$, of metal or the like, surrounds the belt $g^8$ and serves to clamp the latter in place upon the portion $g^{71}$. The ring may be adjusted on the cup to compensate for any adjustment of the other parts, so that the felt will properly contact with the face of the plate $k^4$.

Having thus explained the nature of the invention and described a way of constructing and using the same, though without attempting to set forth all of the forms in which it may be made or all of the modes of its use, I declare that what I claim is—

1. In a powder-measuring machine a reservoir for initially receiving the powder, a hopper communicating therewith, means in said reservoir for forcing the powder into said hopper, stirring devices in said hopper, and a movable measuring device for removing the powder in predetermined quantities from said hopper.

2. In a powder-measuring machine a reservoir for initially receiving the powder, a hopper communicating therewith, stirring devices in said hopper, a reciprocating slide adapted to receive the powder in predetermined quantities from the hopper and withdraw it therefrom, and means for forcing the powder from the slide after it is withdrawn from the hopper.

3. In a powder-measuring machine, a reservoir for initially receiving the powder, a hopper communicating therewith, means for forcing the powder into said hopper, and a reciprocating slide located beneath an aperture in said hopper and having a removable measuring-cup for intermittingly withdrawing predetermined quantities of powder from the hopper through said aperture.

4. In a powder-measuring machine, a reservoir for initially receiving the powder, a hopper communicating therewith and having a discharge-aperture, means in said reservoir for forcing the powder into said hopper, means for regulating the quantity of powder forced thereinto, a reciprocating slide located beneath said discharge-aperture and having means for withdrawing the powder in predetermined quantities from said hopper, and an intermittently-acting device for forcing the powder from the slide after it is withdrawn from the hopper.

5. In a powder-measuring machine, a reservoir for initially receiving the powder, a hopper communicating therewith, means for forcing the powder into said hopper, means for agitating the powder therein, a reciprocating slide operating beneath a discharge-aperture in said hopper and having a removable measuring-cup for withdrawing the powder in predetermined quantities and a reciprocating bar for removing the powder from said cup in the outermost or withdrawn position of said slide.

In testimony whereof I have signed my name to this specification, in the presence of two subscribing witnesses, this 20th day of July, A. D. 1896.

OLIVER H. MARSTON.

Witnesses:
A. D. HARRISON,
P. W. PEZZETTI.